(12) United States Patent
Hana

(10) Patent No.: US 8,702,952 B2
(45) Date of Patent: Apr. 22, 2014

(54) ELECTROSTATIC COALESCER

(75) Inventor: Morten Hana, Oslo (NO)

(73) Assignee: Aker Process Systems AS, Lysaker (NO)

( * ) Notice: Subject to any disclaimer, the term of this patent is extended or adjusted under 35 U.S.C. 154(b) by 685 days.

(21) Appl. No.: 12/676,715

(22) PCT Filed: Sep. 5, 2008

(86) PCT No.: PCT/NO2008/000317
§ 371 (c)(1), (2), (4) Date: Jul. 6, 2010

(87) PCT Pub. No.: WO2009/031905
PCT Pub. Date: Mar. 12, 2009

(65) Prior Publication Data
US 2011/0031124 A1  Feb. 10, 2011

(30) Foreign Application Priority Data

Sep. 7, 2007 (GB) .................................. 0717358.6

(51) Int. Cl.
*B01D 17/04* (2006.01)
*C10G 33/02* (2006.01)

(52) U.S. Cl.
USPC ............ 204/671; 204/573; 204/660; 204/670

(58) Field of Classification Search
USPC ................................................ 204/671, 573
See application file for complete search history.

(56) References Cited

U.S. PATENT DOCUMENTS

| | | | | |
|---|---|---|---|---|
| 3,801,492 A * | 4/1974 | King ............................ 204/671 |
| 5,565,078 A | 10/1996 | Sams et al. |
| 5,647,981 A * | 7/1997 | Prevost et al. ................ 210/243 |
| 5,861,087 A * | 1/1999 | Manning ....................... 204/272 |
| 6,136,174 A * | 10/2000 | Berry et al. ................... 204/671 |
| 7,166,218 B2 * | 1/2007 | Trapy et al. ................. 210/512.1 |
| 2007/0012571 A1 * | 1/2007 | Beckley et al. ............... 204/667 |

FOREIGN PATENT DOCUMENTS

| | | |
|---|---|---|
| EP | 0617115 | 9/1994 |
| EP | 1082168 | 3/2001 |
| FR | 2697443 | 11/1992 |
| FR | 2855078 | 11/2004 |
| GB | 1046317 | 10/1965 |
| GB | 2377397 | 7/2001 |
| NO | 20012238 | 11/2001 |
| WO | 9820954 | 5/1998 |

OTHER PUBLICATIONS

International Search Report for PCT/NO2008/000317 dated Mar. 3, 2009.

* cited by examiner

*Primary Examiner* — Bryan D. Ripa
(74) *Attorney, Agent, or Firm* — Andrus Intellectual Property Law, LLP

(57) ABSTRACT

An electrically energized compact coalescer (50) comprising an elongated, closed shell (53) having a fluid inlet (52) and a fluid outlet (59); at least one electrode (55) mounted in an internal chamber formed in the closed shell and forming at least one narrow gap (58) between the electrode means and a wall in the closed shell. An external power supply (64) is electrically connected to the electrode and the energized electrode (55) is fully encapsulated with insulation to enable an intense electrostatic field to be applied to an electrically conductive emulsion whereby the flow of emulsion through said at least one narrow gap (58) will be non-laminar. One or more helical vanes (57) are disposed in the narrow gap at an angle with respect to the electrode longitudinal axis and extending for at least a portion of the length (L) of the electrode, whereby the fluid flowing through said narrow gap will follow a spiraling pattern at least partially around the electrode (55).

12 Claims, 5 Drawing Sheets

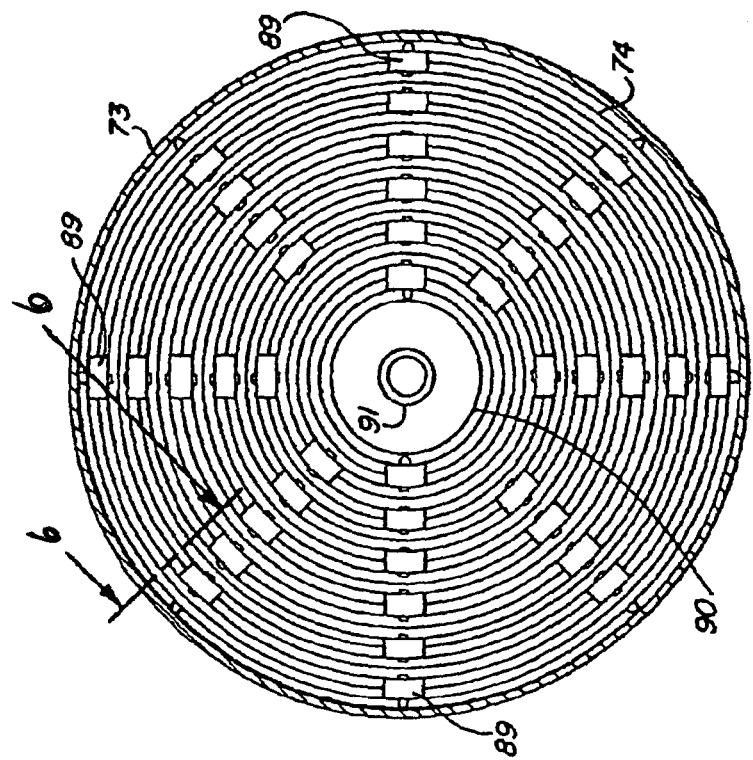
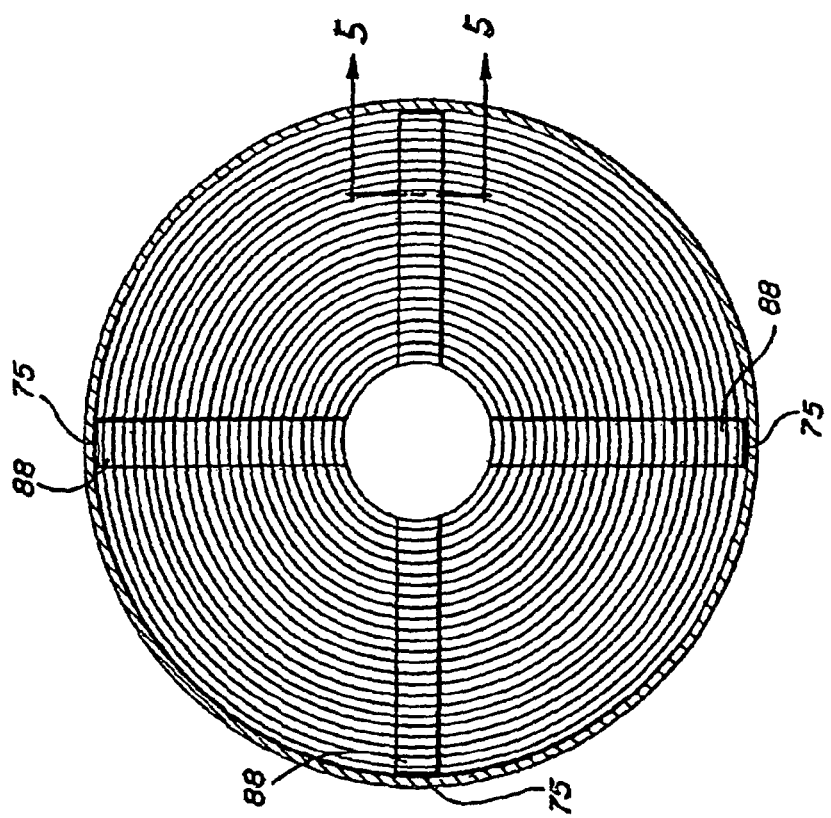

ELECTROSTATIC COALESCER

CROSS REFERENCE TO RELATED APPLICATION

The present application is the U.S. national stage application of International Application PCT/NO2008/000317, filed Sep. 5, 2008, which international application was published on Mar. 12, 2009, as International Publication WO 2009/031905. The International Application claims priority of Norwegian Patent Application 0717358.6, filed Sep. 7, 2007.

FIELD OF THE INVENTION

The present invention relates to improvements in electrostatic coalescers, and more particularly, but not exclusively, to compact electrostatic coalescers.

BACKGROUND OF THE INVENTION

Coalescers are used extensively in oil and gas production to help separate oil and water mixtures. In many production situations a stream of production fluid contains a mixture in the form of an emulsion. The emulsion is a suspension of very small droplets of one fluid phase (for example water) carried in another fluid phase (for example oil). Coalescers are used to increase the size of the droplets. This helps to break down the emulsion and larger droplets separate much more easily (for example under gravity).

An important development in the use of coalescers was the advent of the Compact Electrostatic Coalescer (CEC®; a registered trademark owned by the applicant/assignee of the present application). This device, which is described in European Patent No. 1,082,168 B1, reduced substantially the size requirement of electrostatic coalescers that could be used effectively in separation plants, which is of particular benefit for production installations where space is at a premium. However, a further benefit of the CEC® is its ability to handle a very wide range of oil-to-water ratios in the mixture, and particularly mixtures having a high proportion of water (high water cut). Prior designs of electrostatic coalescers were not able to handle high water cuts due to problems arising from conduction in the water (effectively short-circuiting of the electrodes). In the CEC®, the energised electrodes are fully encapsulated in insulation, which enables an intense electrostatic field to be applied to the emulsion.

Another feature of the CEC® is the creation of narrow flow gaps for the fluid flowing past the electrodes. These help to ensure that there are no recirculation paths for the emulsion, which would reduce the effectiveness of the coalescing. The narrow gaps also help to create a turbulent or transitional flow regime, avoiding laminar flow which would also reduce the effectiveness.

A particularly suitable design of CEC®, as described in EP 1,082,168, includes a series of nested annular cylindrical electrodes of progressively increasing diameter arranged with narrow annular flow gaps between them. The electrodes are situated inside a cylindrical vessel with a fluid inlet at one end and a fluid outlet at the other end. The preferred orientation is with a vertical cylinder axis, such that the fluid inlet is above the electrodes and fluid flows vertically downwards towards the fluid outlet. This is because coalesced water droplets begin to settle under gravity, and a vertical orientation prevents a water layer forming next to an electrode. Such a water layer changes, and could adversely affect, the electrostatic field. However, effective coalescing of droplets in an emulsion requires a certain residence time of the fluid in the electrostatic field. This residence time results in a minimum required length of electrode, which in turn dictates a minimum overall height of the coalescer.

The known CEC® such as the ones disclosed by EP 1,082,168, generally comprise a cylindrical vessel mounted vertically and having an inlet for a fluid mixture, such as an oil and water emulsion. The inlet is situated near the top of the vessel. Inside the vessel are one or more vertically aligned electrodes, having narrow flow gaps such that the fluid mixture flows in the indicated flow direction past the electrode surfaces. The electrodes are fully insulated and are connected to a high voltage supply, allowing an intense electrostatic field to be generated in the narrow gaps.

It will be appreciated that one way to generate an intense electrostatic field in the narrow gap, is for an electrode at one side of the gap to be energised by the high voltage, while the surface at the other side of the gap is held at ground potential. This means that, in a particular arrangement where there are narrow gaps between a series of electrode structures, the high voltage energises each alternate electrode structure, while the other alternating electrode structures in between are held at ground potential. In such cases, only the energised electrodes need to be insulated.

As the fluid mixture passes through the narrow gaps, the effect of the electrostatic field is to coalesce droplets of one phase (e.g. water). The larger coalesced droplets are then more easily separated (for example in a settling vessel located downstream of the CEC®). This effect is enhanced if the fluid flow is in a turbulent (or at least transitional) flow regime (Reynolds No. >2000, typically in the range 2000-8000).

After the fluid has passed the electrodes, it enters a flow calming section at the bottom of the vessel before passing out through an outlet. The flow calming section helps to prevent re-mixing or breaking up of the coalesced droplets.

The height of the known CEC® is determined largely by the height (i.e. vertical extension; length) of the electrodes, which is determined by the required residence time of the fluid in the electrostatic field, while maintaining a flow velocity in order to ensure that the flow is in a turbulent or transitional regime (i.e. not in a laminar regime). In a typical known CEC® the electrodes are 2 m in height, making the overall height of the CEC® substantially more than this.

There are many situations where a compact electrostatic coalescer is used in association with other process equipment, such as settling or separation vessels. Space is often at a premium, especially on off-shore production platforms, and in some circumstances the height available may be restricted. It is therefore a need for an electrostatic coalescer which is reduced in size, while maintaining the process conditions and capabilities.

SUMMARY OF THE INVENTION

The present invention has been conceived with the foregoing in mind and provides an electrically energized compact coalescer for breaking oil-in-water emulsions, comprising an elongated, closed shell having a fluid inlet and a fluid outlet; at least one electrode mounted in an internal chamber formed in the closed shell and forming at least one narrow gap between the electrode means and a wall in the closed shell; an external power supply electrically connected to the at least one electrode, for energizing said electrode, said energized electrode being fully encapsulated with insulation to enable an intense electrostatic field to be applied to an electrically conductive emulsion whereby the flow of emulsion through said at least one narrow gap will be non-laminar, characterised by one or more elongated element of a material having good dielectric strength, disposed in said narrow gap at an angle with respect to the electrode longitudinal axis and extending for at least a portion of the length of the electrode, whereby the fluid flowing through said narrow gap will follow a spiralling pattern at least partially around the at least one electrode.

In one embodiment, the elongated element is mounted on the energized electrode and projects across the narrow gap, thus forming at least one helical flow channel within the narrow gap.

In one embodiment, the elongated element is mounted on a grounded element in the closed shell and projects across narrow gap, thus forming at least one helical flow channel within the narrow gap.

The coalescer may comprise a plurality of concentric cylindrical electrodes forming narrow annular gaps there between.

In one embodiment the gap comprises an annular passage one side of which is a cylindrical surface of said at least one electrode.

In one embodiment the elongated element comprises a helical vane, and the vane is configured to impart a circumferential component of a flow velocity of a fluid flowing into said gap in an axial direction.

The elongated element may have an angle of between 30 and 60 degrees to the coalescer axial direction, and the vane may in one embodiment extend substantially the entire length of said gap. In another embodiment, the vane extends for only a portion of the length of said gap.

In one embodiment, the electrostatic coalescer is mounted such that the direction of the fluid flow entering the narrow flow passage is at an angle of less than 45 degrees to the horizontal, and wherein the direction of the fluid flow entering the narrow flow passage is substantially horizontal.

It is an advantage that, by imparting a swirling or spiral motion to the fluid, the path taken by the fluid flowing through the narrow passage between the electrodes is longer for a given electrode length. This means that, if the flow regime (defined by the Reynolds Number) is maintained with the required degree of turbulence, the length of the electrodes can be made shorter while still maintaining the required residence time.

In embodiments of the invention, the electrostatic coalescer may comprise a plurality of narrow flow passages between the inlet and the outlet. The electrostatic coalescer may also comprise a plurality of electrodes.

In embodiments, the narrow flow passage may be an annular passage one side of which is a cylindrical surface of the at least one electrode.

Embodiments of the invention also have the advantage that, in certain circumstances, it is possible to mount the coalescer in a non-vertical orientation. The swirling motion of the flow imparted by the elongates element is sufficient to carry the water droplets such that they do not settle or accumulate to a significant extent next to an electrode. In some circumstances it may be possible to mount the coalescer with the axis of the electrodes oriented horizontally, the swirling motion being sufficient to lift the coalesced water droplets to a sufficient extent that they do not settle, but are carried through to the outlet.

In embodiments of the invention, the electrostatic coalescer further comprises flow straightening means disposed between the electrode and the outlet.

The invention thus provides an electrostatic coalescer which is of a shorter length compared to known electrostatic coalescers, but with a larger diameter maintaining similar process conditions and capabilities of the, e.g. turbulent flow, electrostatic field strength, residence time. The invention also allows an electrostatic coalescer to be oriented horizontally.

BRIEF DESCRIPTION OF THE DRAWINGS

These and other characteristics of the invention will be clear from the following description on an embodiment of the invention, given as a non-restrictive example with reference to the accompanying drawings, in which:

FIG. 3 is a cross-sectional view, taken along line 3-3 of FIG. 2;

FIG. 4 is a further cross-sectional view, taken along line 4-4 of FIG. 2;

DETAILED DESCRIPTION OF AN EMBODIMENT

Figure 1:
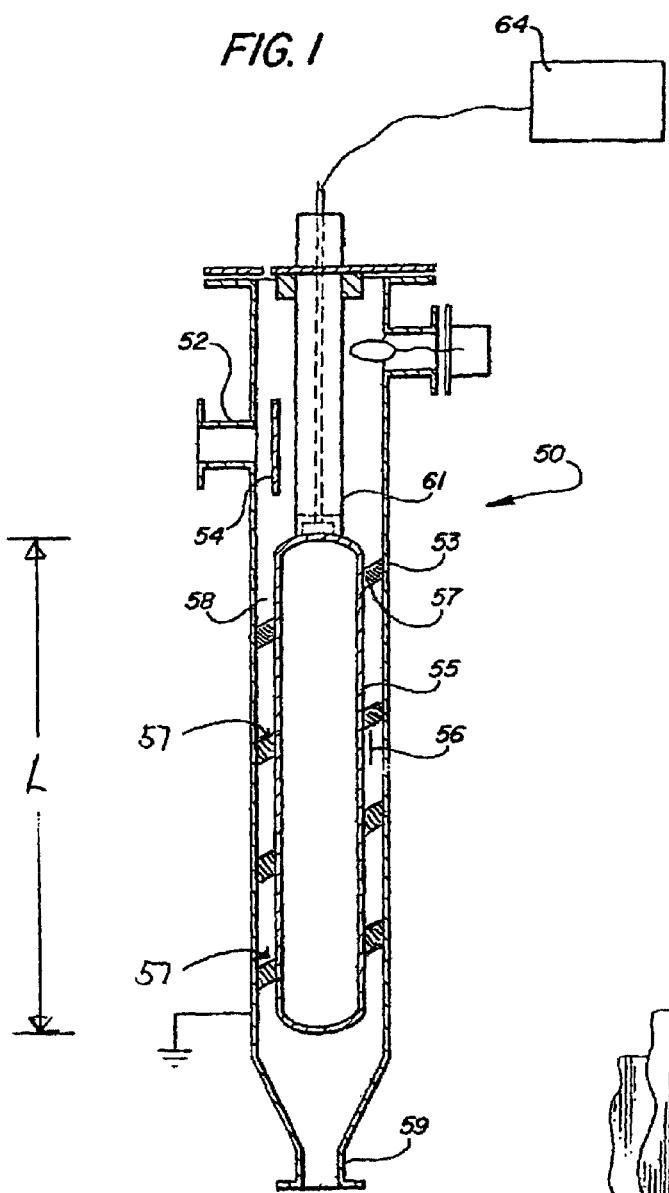
FIG. 1 is a schematic illustration, partially in cross-section, of an embodiment of the electrostatic coalescer in accordance with the present invention, having a single narrow flow annulus with short residence time used to subject a water-in-oil emulsion to an intense electrostatic field, under turbulent flow conditions.
Figure 5:
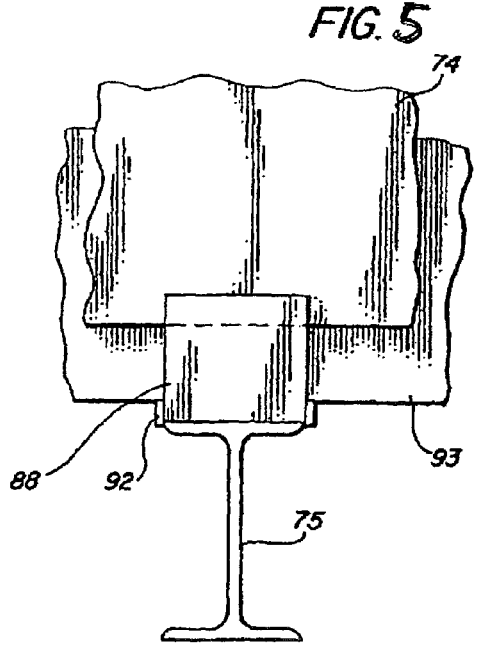
FIG. 5 is a cross-sectional view, taken along line 5-5 of FIG. 3.
Figure 2:
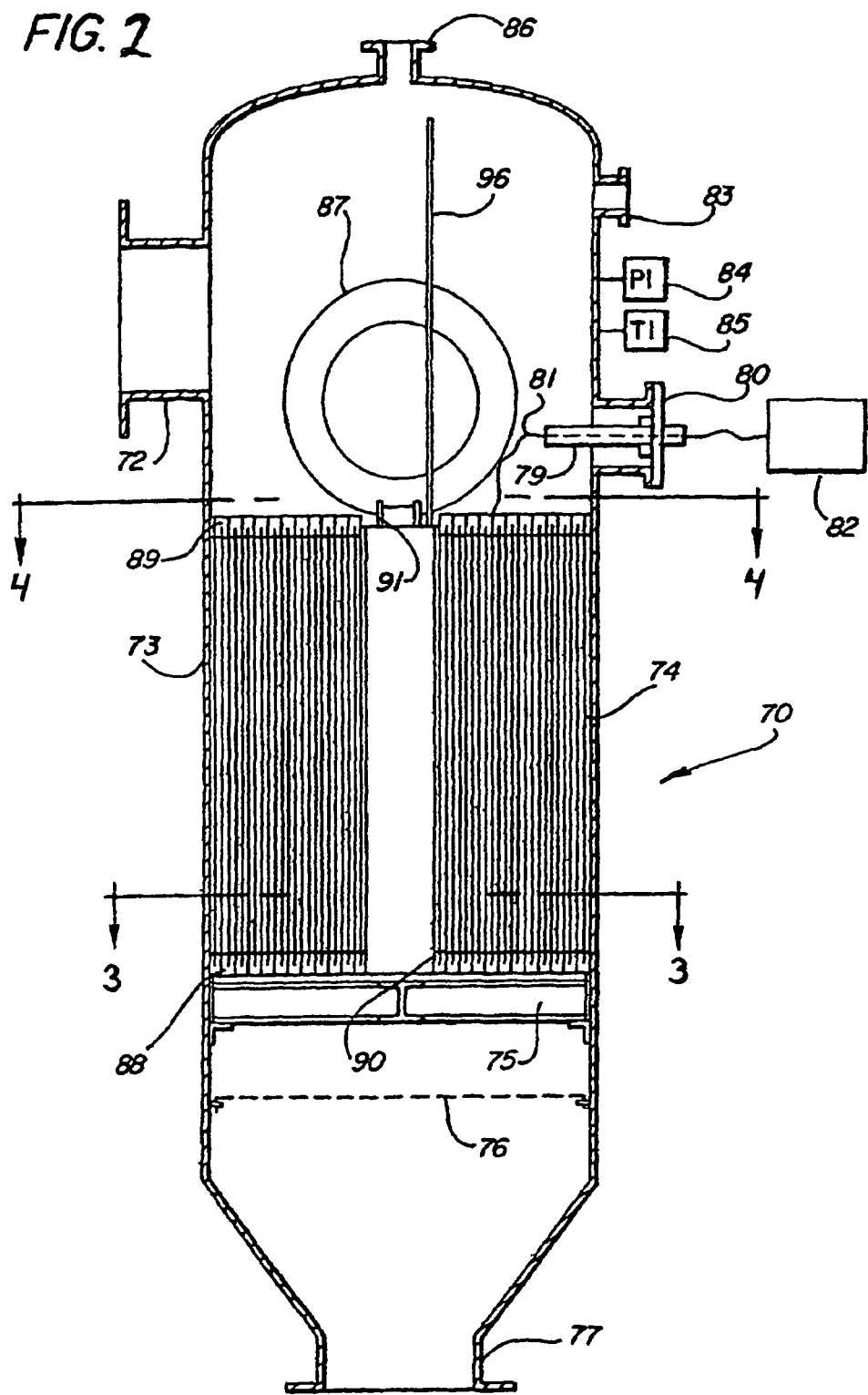
FIG. 2 is a schematic illustration, partially in cross-section of a further embodiment of the compact coalescer of the present invention, used for large scale production requirements, and having a multi-annulus electrode configuration.

Referring to FIG. 1, the electrostatic coalescer 50 according to the invention comprises a coalescer 50 having an inlet nozzle 52 for a non-laminar emulsion flow stream into a vertical, exterior pressure-containing shell 53, which is electrically grounded. An internal baffle shield 54 deflects the emulsion flowing into the internal chamber of the pressure-containing shell 53 to the outer edge of the chamber so that the incoming fluid does not impinge on the entrance bushing 61. The coalescer also comprises an internal electrode 55, preferably in the form of an annulus and coated on its external surface with an insulating layer 56, having good dielectric strength, such as a fluropolymer, or the like. A flow gap 58 is thus provided between the insulated electrode 55 and an internal wall of the shell 53. A fluid outlet 59 is provided at the bottom region of the shell 53.

A helical vane 57 is disposed in the annular flow gap 58 between the electrode 55 and the internal wall shell 53, thus forcing the fluid to flow in a helical—or spiralling—pattern as it moves along the electrode. FIG. 1 shows one helical vane 57, but the skilled person will understand that the number of vanes may be increased, thus creating a plurality of flow paths within the annular flow gap 58.

The helical vane 57 comprises a material having good dielectric strength, and is attached to the electrode 55 and extends in the illustrated embodiment through the narrow gap 58, almost to the grounded shell wall. The small slit (not shown) between the vane and the shell wall will not cause any significant pressure drop, due to the flow properties of the fluid. The vane may also be attached to the grounded shell and extending almost to the electrode 55. Alternatively, the vane 57 may extend completely across the narrow gap 58, abutting the electrode and the wall, and thus also serve as a centralizer element for the electrode 55.

The helical vane or vanes thus induce a gentle swirling motion to the fluid, or a spiral flow path, and as a consequence of the vane 57, the distance travelled by the flow (i.e. the effective flow path) along the electrode 55 in the coalescer of the invention is greater than the height (or length, L) of the electrode 55. This means that an equivalent residence time and flow velocity can be achieved with electrodes that have a length L shorter than the lengths of the electrodes of known coalescers having similar performance criteria. For example, an equivalent residence time and velocity to that of a known vertical flow coalescer, such as the CEC® discussed above, having 2 m long electrodes, may be achieved with the invention with a spiral flow path that is angled at 45 degrees to the coalescer 50 longitudinal axis and where the length L of the electrode 55 is only 1.4 m. It will be recognised that, in order to achieve the same total flow throughput, the diameter of the shell 53 will be larger than that of the pressure vessel of the known vertical flow coalescers.

In use, after the fluid mixture has passed the electrode 55 in its spiral motion, it enters a flow calming and straightening section, before passing to an outlet 59.

Referring now to FIGS. 2-6, there shown is a second embodiment of the present invention, comprising a large-scale, multi-annulus electrostatic coalescer 70 for having a non-laminar emulsion flow stream flowing through an inlet nozzle 72 of an exterior pressure-containing shell 73, which is electrically grounded. An electrode array comprising a plurality of cylindrical electrodes 74, forming a plurality of spaced, concentric cylinders separated by narrow gaps 66, is mounted within the internal chamber of the shell 73, as by means of an electrode-support structure 75. A flow distribution baffle 76, which is preferably perforated, is shown mounted within the shell 73, after the plurality of electrodes 74, and before an outlet nozzle 77 through which the broken oil and water emulsion exits at 78. Power is supplied to the array of electrodes 74 via a power source 82 sealingly connected through the side wall of the shell 73, via an entrance bushing 79, held in an entrance bushing hanger flange 80. A high voltage wire 81 connects the array of electrodes 74 to the bushing 79, and to the high voltage transformer 82. The shell 73 includes a low-liquid-level shutdown switch 83, and may also include a pressure gauge 84 and a temperature gauge 85. The top of the shell is provided with a gas vent outlet 86 and can be provided with a manway 87.

A gas bleed tube 96 allows any gases trapped in the bottom zone of the vessel to escape to the top without back flowing up through the electrostatic field between the electrodes.

As best shown in FIGS. 3-6, the array of electrodes 74 have a plurality of energized electrode insulators/spacers 88 at lower or bottom ends thereof, and grounded electrode insulators/spacers 89 at upper or top ends thereof. The array of electrodes 74 are provided with an inner mandrel 90 and an upper electrode assembly lifting connection 91. The bottoms of the array of electrodes, are supported by the electrode support structure 75, and include guide plates 92 to hold the energized electrode insulators/spacers 88. Additionally, alternate electrodes in the concentric array are grounded, as shown by the bare grounded electrodes 93.

The upper end of the outer cylindrical concentric electrode includes a plurality of electrode centralizers 94 mounted thereon, adjacent the inner wall of the shell 73, to insure that the outer cylindrical electrode does not contact the inner wall of the shell. Additionally, at the upper end of each of the grounded electrodes, there are provided grounded electrode insulator/spacer set screws 95, holding the grounded electrode insulator/spacers 89 in position between adjacent concentric electrodes.

Figure 6:
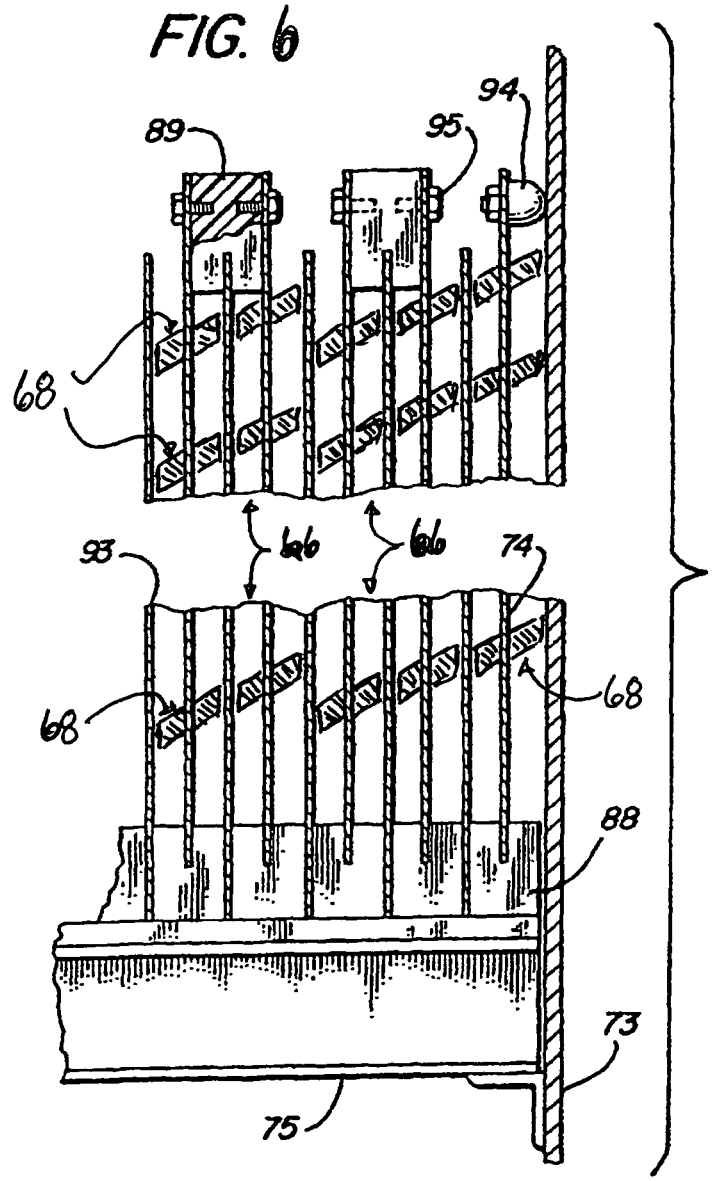
FIG. 6 is a cross-sectional view, taken along line 6-6 of FIG. 4.

As is shown on FIG. 6, helical vanes 68 are provided in the narrow gaps 66 between the concentric electrodes of different radii. The vanes 68, comprising a material having good dielectric strength, and are in the embodiment illustrated in FIG. 6 mounted on the energized electrodes 74 and extending almost all the way across the narrow gap 66, to the grounded electrode 93 on the opposite side of the narrow gap 66. The small slits between the vanes 68 and the grounded electrodes will not cause any significant pressure drop, due to the flow properties of the fluid. The vanes may also be attached to the grounded electrodes and extending almost to the energized electrodes. Alternatively, the vanes 68 may extend completely across the narrow gap 66, abutting adjoining electrodes and/or the shell wall, and thus also serve as centralizer elements for the electrodes.

Non-laminar flow of emulsion is thus through the helical flow paths provided by the vanes 68 in the narrow gaps 66 between the concentric electrodes of different radii, and an intense electrostatic field is applied evenly to the emulsion.

One advantage of the shorter electrodes 55, 74, 93 is that the compact coalescer of the invention can be used in spaces where there is insufficient headroom for a vertical compact coalescer which is known in the art. This can be very important for certain installations, such as on offshore production platforms.

Figure 7:
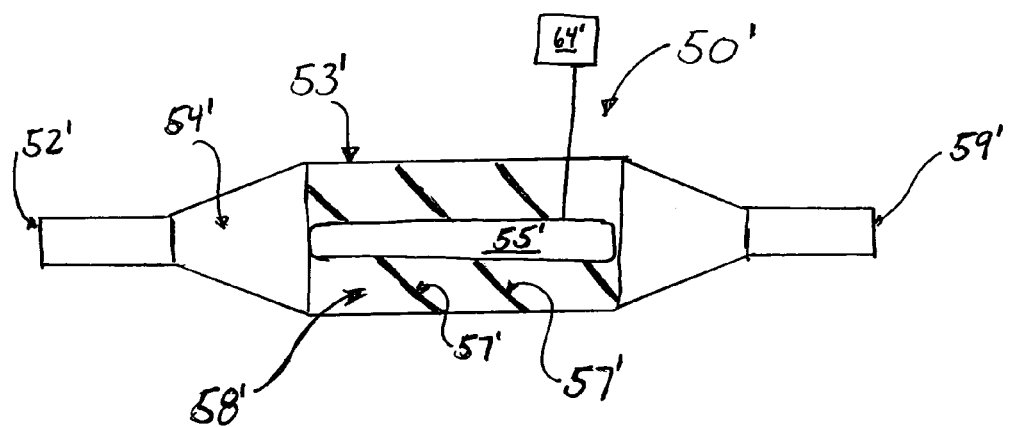
FIG. 7 is a schematic illustration of a horizontally mounted coalescer in accordance with the present invention.

Another consequence of the spiral flow path through the electrodes is that the swirling motion of the fluid flow enables the compact electrostatic coalescer to be mounted in a different orientation; i.e. it does not have to be mounted vertically. As shown in FIG. 7, a compact electrostatic coalescer 50' according to the invention may be mounted horizontally. A cylindrical vessel 53' is mounted with a horizontal axis in-line between an inlet 52' and an outlet 59'. Fluid entering through the inlet 52' enters a distributor section 54' so that the flow is evenly distributed into the narrow flow gaps 58' beside each of the vanes, shown generally at 57', along the length of the electrode 55' which is energized by means of the power supply 64'.

After exiting the spiral flow path at the end of the electrode(s) 55', the fluid enters a flow calming and straightening section before exiting the vessel 53' through the outlet 59'.

The swirling motion of the fluid flow means that the coalesced droplets (e.g. of water) are kept moving in a tangential direction (relative to the axis of the vessel 53'). This prevents the build up of a layer of water due to gravity, and means that the electrostatic field is not disrupted.

Figure 8:
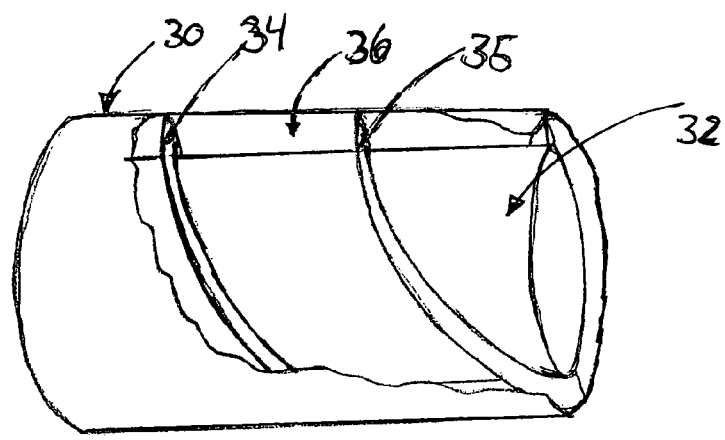
FIG. 8 is a partially cut-away illustration of an embodiment of the invention.

A further illustration of the vane arrangement is provided in FIG. 8. An outer annular cylindrical electrode 30 surrounds an inner annular cylindrical electrode 32. The electrodes 30, 32 may be just two of a nested series of cylindrical annular electrodes, such as described above and in EP 1,082,168. Between the outer electrode 30 and the inner electrode 32 is a narrow annular gap 36. Mounted between the outer electrode 30 and the inner electrode 32 are a pair of spiral guide vanes 34, 35, which bridge the narrow annular gap 36. Flow entering the narrow annular gap 36 at one end is constrained to move in a spiral path defined by the spaces between the spiral vanes 34, 35.

It will be appreciated that there do not have to be two spiral vanes arranged in each narrow annular gap. A single vane, or three or more vanes may be provided. The angle of the vanes relative to the longitudinal axis of the coalescer may be varied to suit a particular application. Angles between 30 degrees and 60 degrees are suitable, with 45 degrees being a particularly preferred angle. Also, the number and angle of the vanes may vary according to the diameter of the electrodes, especially where a series of many nested electrodes are employed. A plurality of flow paths along the electrode(s) may thus be provided.

The vanes 34, 35 shown in FIG. 8 extend the entire length of the electrodes 30, 32. However, the swirling motion may be provided by vanes that only extend for a portion of the electrode length. For example, swirl vanes may be provided close to the inlet end of the electrodes, which extend only part of the way along the electrodes. In this example, the swirling motion of the flow, once imparted by the vanes, would continue for a substantial distance along the un-vaned portion.

The vanes must be of a material having good dielectric strength, in order not to disrupt the intense electrostatic field imposed on the fluid flow.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

The invention claimed is:

1. An electrically energized compact coalescer for breaking oil and water emulsions, comprising an elongated, closed shell having a fluid inlet and a fluid outlet; a plurality of concentric cylindrical electrodes mounted in an internal chamber formed in the closed shell and forming annular flow passages between the electrodes; an external power supply electrically connected to the electrodes, for energizing said electrodes, said energized electrodes being fully encapsulated with insulation to enable an electrostatic field to be applied to an electrically conductive emulsion fluid, for generating a non-laminar flow of the emulsion through said flow passages, wherein elongated elements are disposed in said flow passages at an angle with respect to the electrodes longitudinal axis and extending for at least a portion of the length of the electrodes, whereby the elongated elements induce a gentle swirling motion in the fluid flowing through said flow passages and that the fluid will follow a spiraling pattern at least partially around the annular flow passages, wherein the elongated elements comprise helical vanes configured to impart a circumferential component to a flow velocity of the fluid flowing into said flow passages in an axial direction, wherein the angle at which the elongated elements are disposed is between 30 and 60 degrees, and further wherein the angle varies according to the diameter of the electrodes.

2. The coalescer of claim 1, wherein the elongated elements are mounted on the energized electrodes and project across the flow passages, thus forming helical flow channels within the flow passages.

3. The coalescer of claim 1, wherein the elongated elements are mounted on grounded elements in the closed shell and project across the flow passages, thus forming helical flow channels within the flow passages.

4. The coalescer of claim 1, wherein the vanes extend substantially the entire length of said flow passages.

5. The coalescer of claim 1, wherein the vanes extend for only a portion of the length of said flow passages.

6. The coalescer of claim 1, wherein the coalescer is mounted such that the direction of the fluid flow entering the flow passages is substantially vertical.

7. The coalescer of claim 1, wherein the coalescer is mounted such that the direction of the fluid flow entering the flow passages is substantially horizontal.

8. The coalescer of claim 1, wherein the coalescer is mounted in a substantially vertical orientation.

9. The coalescer of claim 1, wherein the coalescer is mounted in a substantially horizontal orientation.

10. The coalescer of claim 1, wherein the elongated elements comprise a material having adequate dielectric strength.

11. The coalescer of claim 1, wherein the flow passages comprises flow gaps, whereby the flow gaps are narrow such that there are no recirculation paths for the emulsion and whereby laminar flow is avoided.

12. The coalescer of claim 1, wherein the coalescer comprises flow straightening means disposed between said electrodes and the outlet.

* * * * *